United States Patent
Bouchard et al.

(10) Patent No.: US 10,871,450 B2
(45) Date of Patent: Dec. 22, 2020

(54) LASER-INDUCED BREAKDOWN SPECTROSCOPY SYSTEM AND METHOD, AND DETECTION SYSTEM AND METHOD THEREFOR

(71) Applicant: NATIONAL RESEARCH COUNCIL OF CANADA, Ottawa (CA)

(72) Inventors: Paul Bouchard, Montreal (CA); Mohamad Sabsabi, Longueuil (CA); Christian Padioleau, Montreal (CA); Rene Heon, Boucherville (CA); Peter John Hardman, Woburn, MA (US)

(73) Assignee: NATIONAL RESEARCH COUNCIL OF CANADA, Ottawa (CA)

(*) Notice: Subject to any disclaimer, the term of this patent is extended or adjusted under 35 U.S.C. 154(b) by 0 days.

(21) Appl. No.: 16/342,543

(22) PCT Filed: Oct. 20, 2017

(86) PCT No.: PCT/CA2017/051260
§ 371 (c)(1),
(2) Date: Apr. 17, 2019

(87) PCT Pub. No.: WO2018/072038
PCT Pub. Date: Apr. 26, 2018

(65) Prior Publication Data
US 2019/0242826 A1 Aug. 8, 2019

Related U.S. Application Data

(60) Provisional application No. 62/410,955, filed on Oct. 21, 2016.

(51) Int. Cl.
*G01J 3/30* (2006.01)
*G01N 21/71* (2006.01)

(52) U.S. Cl.
CPC ..... *G01N 21/718* (2013.01); *G01N 2201/0221* (2013.01); *G01N 2201/06113* (2013.01)

(58) Field of Classification Search
CPC .... G01N 21/75; G01N 21/0332; G01N 21/05; G01N 21/65; G01N 2021/052; G01N 2021/0389; G01N 2021/0346; G01J 3/44
See application file for complete search history.

(56) References Cited

U.S. PATENT DOCUMENTS

| | | |
|---|---|---|
| 5,798,832 A | 8/1998 | Hnilica et al. |
| 5,847,825 A | 12/1998 | Alexander |

(Continued)

FOREIGN PATENT DOCUMENTS

| | | |
|---|---|---|
| CN | 102252976 B | 10/2012 |
| CN | 105021281 A | 11/2015 |

(Continued)

OTHER PUBLICATIONS

F. B. Gonzaga, C. Pasquini, A compact and low cost laser induced breakdown spectroscopic system: Application for simultaneous determination of chromium and nickel in steel using multivariate calibration, Spectrochimica Acta Part 8, 69 (2012) 20-24, Mar. 7, 2012.

(Continued)

*Primary Examiner* — Abdullahi Nur
(74) *Attorney, Agent, or Firm* — Merizzi Ramsbottom & Forster (57) ABSTRACT

Described are various embodiments of a system, method and device for laser induced breakdown spectroscopy (LIBS). In some embodiments, the LIBS system comprises a silicon photomultiplier (Si PM) operated in a time-gated photon counting mode. Some such embodiments allow for the provision of a portable LIBS device. Also provided are embodiments for the measurement of constituent carbon, (Continued)

gold and/or other precious metal group elements in a target sample.

25 Claims, 4 Drawing Sheets

(56) References Cited

U.S. PATENT DOCUMENTS

| | | | |
|---|---|---|---|
| 6,335,529 B1 * | 1/2002 | Sekii | G01J 1/58 |
| | | | 250/372 |
| 6,407,811 B1 | 6/2002 | Snyder et al. | |
| 7,016,035 B2 * | 3/2006 | Wu | G01J 3/02 |
| | | | 356/318 |
| 9,061,369 B2 | 6/2015 | Yoo et al. | |
| 2003/0218745 A1 | 11/2003 | Benicewicz et al. | |
| 2007/0273888 A1 | 11/2007 | Kamihara | |
| 2007/0296967 A1 | 12/2007 | Gupta et al. | |
| 2011/0085165 A1 | 4/2011 | Beckstead et al. | |
| 2012/0206722 A1 | 8/2012 | Grigoropoulos et al. | |
| 2013/0070242 A1 | 3/2013 | Liu et al. | |
| 2013/0277340 A1 | 10/2013 | Liu et al. | |
| 2015/0103334 A1 | 4/2015 | Quant et al. | |
| 2016/0116416 A1 | 4/2016 | Wang et al. | |
| 2017/0292917 A1 * | 10/2017 | O'Dell | G08B 21/12 |
| 2017/0315046 A1 * | 11/2017 | Du | G01N 21/6428 |

FOREIGN PATENT DOCUMENTS

| | | |
|---|---|---|
| DE | 4341462 A1 | 6/1995 |
| JP | S5140183 A | 4/1976 |
| WO | 2014023423 A1 | 2/2014 |
| WO | 2015077867 A1 | 6/2015 |
| WO | 2016139386 A1 | 9/2016 |
| WO | 2016149701 A1 | 9/2016 |

OTHER PUBLICATIONS

K. Novotny et al., Double Pulse Laser Ablation and Plasma: Time Resolved Spectral Measurements, II Central European Symposium on Plasma Chemistry 2008, Chem. Listy 102, s1309-s1402 (2008).
Goncharov V. K. et al., "Comprehensive optical diagnostics of laser-induced plasma objects", Journal of Physics: Conference Series, Institute of Physics Publishing, Bristol, GB, vol. 666, No. 1, Jan. 11, 2016, p. 12016.

* cited by examiner

LASER-INDUCED BREAKDOWN SPECTROSCOPY SYSTEM AND METHOD, AND DETECTION SYSTEM AND METHOD THEREFOR

CROSS REFERENCE TO RELATED APPLICATIONS

This application claims the benefit of U.S. Provisional Patent Application No. 62/410,955, filed Oct. 21, 2016, which is incorporated herein by reference in its entirety.

FIELD OF THE DISCLOSURE

The present disclosure relates to laser-induced breakdown spectroscopy, and in particular, to a laser-induced breakdown spectroscopy system and method, and detection system and method therefor.

BACKGROUND

Various analytical tools are currently available to perform quantitative determination of elements in samples, including Laser-Induced Breakdown Spectroscopy (LIBS). LIBS generally relies on the use of a repetitively-fired laser source to emit intense and short pulses of light that are used to ablate/vaporize matter from a sample target. The interaction of the laser pulse with the vaporized matter creates a plasma plume, which in turn radiates light. The analysis of the plasma-emitted light brings qualitative and quantitative information on the nature and concentration of the target's constituent elemental components. More specifically, the qualitative and quantitative data related to the elemental components of the target is obtained from the processing and analysis of the spectral signature of the plasma-emitted light.

In a typical LIBS configuration, the light emitted by the plasma is collected by some optical means and brought into a spectrometer, whose function is to extract the spectral information contained in the plasma-emitted light. The output of the spectrometer consists of a spectrum (in the form of a two-dimensional profile representing the light intensity vs. optical wavelength), which is characteristic of the collected light. The spectral distribution is recorded by means of a detector (often a line or 2-D camera).

The spectral profile provided by the spectrometer is made up of a collection of spectral lines. Each of these lines is related to an element present in the plasma plume. The elements found in the plasma come from the ablated/vaporized matter from the target and from the ambient gas, if any. The analysis of the spectral lines provides information on the nature of the elements in the plasma as well as their concentration.

The duration of the plasma-generation laser pulse is short. In a typical nanosecond laser generation regime, the pulse's full width at half-maximum (FWHM) is in the range of a few ns. Therefore, in this regime, the plasma light emission will start just after the laser pulse firing; it will grow, decay and finally disappear after a certain period of time (lifetime).

As is known to those skilled in the art, the temporal behaviour of the LIBS plasma-emitted light is correlated to the evolution of the plasma temperature and the electronic density. At the earliest time, the plasma light is dominated by a "white light" continuum that has little intensity variation as a function of wavelength. This light is caused by bremsstrahlung and recombination radiation from the plasma as free electrons and ions recombine in the cooling plasma. If the plasma light is integrated over the entire emission time of the plasma, this continuum light can seriously interfere with the detection of weaker emissions from minor and trace elements in the plasma. For this reason, LIBS measurements are usually carried out using time-resolved detection. In this way the strong background light at early times can be removed from the measurements by turning the detector on after this background light has significantly subsided in intensity but atomic emissions are still present. Relevant parameters for time-resolved detection generally include $t_d$, the time between plasma formation and the start of the observation of the plasma light, and $t_b$, the time period over which the light is recorded.

Therefore, by selecting a proper time delay $t_d$ between the onset of the laser pulse and the signal acquisition window, the optimum contrast between the intensity profiles of the spectral lines and the signal background can be achieved. This increases the dynamic range of the measurement, which in turn contributes to maximize the sensitivity of the technique and to achieve lower values for the limit of detection (LOD). For this reason, LIBS measurements are generally performed in the gated (time-resolved) regime.

The measurement sensitivity also depends on the laser beam fluence (defined as the ratio corresponding to the laser pulse energy divided by the area of the beam spot) at the target surface. For instance, in order to achieve the ablation of the target material and create a plasma, a minimum (threshold) value of the fluence must be reached. Furthermore, the sensitivity is a function of the radiant flux emitted by the plasma; for a given fluence, the larger the plasma size (that is, the larger the beam spot size), the higher the total radiant flux which can be collected by the system. As a reference, laser sources currently used in typical LIBS setups will generally include a flash lamp-pumped (FP) or diode-pumped solid-state (DPSS) laser source with active Q-switching, having a pulse energy from a few mJ to a few hundreds of mJ; a spot size (diameter) from a few 10 s µm to 1 mm; and a repetition rate from a few Hz to 100 Hz.

When performing time-resolved measurements, the gated spectral signal is acquired at each laser shot. In order to achieve time-resolved measurements, a CCD camera equipped with an image intensifier (ICCD) is used as detector. In this configuration, the image intensifier has two functions: it acts as a very fast optical shutter (typically with sub-ns rise and fall times), therefore allowing the selection of relevant gating parameters $t_d$ and $t_b$ with high accuracy and shot-to-shot reproducibility; and owing to its adjustable internal gain, it allows matching/optimizing the dynamic range of the input signal intensity with the camera's CCD sensor.

That being said, while providing a viable solution for laboratory use, ICCD cameras tend to be bulky and heavy, their image intensifiers tend to be particularly fragile, and the general cost for an ICCD can generally range from US $50,000 to US $60,000, all potentially significant drawbacks.

It is also possible to perform delayed signal acquisition ($t_d$) using low cost line cameras such as those equipping some compact spectrometers. However, these detectors have substantial limitations related to the acquisition gate width ($t_b$), which in some cases cannot be set below a given value (e.g. the ms range).

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for a laser-induced breakdown spectroscopy system and method, and detection system and method therefor, that overcome some of the drawbacks of known techniques, or at least, provides a useful alternative thereto. Some aspects of this disclosure provide examples of such systems and method.

In accordance with one aspect, there is provided a laser-induced breakdown spectroscopy (LIBS) system to detect a constituent element of interest within a sample, the system comprising a silicon photomultiplier (SiPM).

In accordance with another embodiment, there is provided use of a silicon photomultiplier in a laser-induced breakdown spectroscopy (LIBS) system to detect a constituent element of interest within a sample.

In accordance with another embodiment, there is provided a method for detecting a constituent element of interest within a sample, the method comprising: irradiating the sample using repetitive laser pulses to create a plasma that emits light representative of the sample's one or more constituent elements; directing at least a spectral portion of said emitted light that is within a predefined wavelength interval corresponding with the constituent element of interest toward a silicon photomultiplier (SiPM); detecting, via said SiPM, said spectral portion of said emitted light within said predefined wavelength interval; and outputting a signal representative of said spectral portion and thereby indicative of a presence of the constituent element of interest within said sample.

In accordance with another embodiment, there is provided a portable laser-induced breakdown spectroscopy (LIBS) device to detect a constituent element of interest within a sample, the device comprising: a portable housing; a pulsed laser source mounted within said housing and operable to irradiate the sample using repetitive laser pulses and thereby create a plasma that emits light representative of the sample's one or more constituent elements; intervening optics mounted within said housing to define an optical path for at least an emitted spectral portion of said emitted light that is within a predefined wavelength interval corresponding with the constituent element of interest; and a detector operatively mounted within said housing to intercept said path and detect said spectral portion of said emitted light within said predefined wavelength interval, and output a signal representative thereof.

In accordance with another embodiment, there is provided a laser-induced breakdown spectroscopy (LIBS) system having a pulsed laser light source to produce a plasma from a sample that emits light representative of the sample, the system comprising: a detector to detect a spectral portion of the light within a predefined wavelength interval corresponding with a constituent element of interest, and output a signal representative thereof; wherein said detector is operable in a time-gated photon counting mode so to constrain detection of said spectral portion to a predefined temporal window predefined relative to each laser pulse, and so as to count photons detected thereby within said window over multiple laser pulses to output said signal, thereby allowing to gather individual information from each plasma and/or accumulate these plasmas over multiple pulses.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 3A and 3B are graphs of a measurement of the carbon line for a given sample performed with a fiber laser, ICCD camera, with accumulation on chip, but without time-gating, in which FIG. 3B shows how the carbon line can hardly be extracted in this mode from the spectral feature shown inside the dotted ellipse of FIG. 3A for carbon concentrations ranging from 0 to 14,000 ppm.

DETAILED DESCRIPTION

As noted above, the application of LIBS within standard laboratory environments generally entails the use of high energy laser sources that are paired with expensive and bulky ICCDs or somewhat less versatile line cameras.

In order to extend the application of LIBS to applications beyond the standard laboratory setting, such as those involving portable or handheld systems, certain implementation criteria become more relevant, such as, but not limited to: minimization of system weight and volume, increased robustness, adequate analytical performance (e.g. sensitivity, LOD, accuracy), costs, etc. These criteria may generally equally apply to the system as a whole, as to its various constituent components and elements (e.g. laser source, detector(s), intervening optics, etc.). The systems and methods described herein provide, in accordance with different embodiments, different solutions to expand the field of use for LIBS, such as for example, in providing for portable, robust and/or low cost LIBS systems.

For example, in one exemplary embodiment described in further detail below, the use of a pulsed fiber laser provides one example of a constituent LIBS system component lending itself well to the achievement of the above-noted criteria. For instance, pulsed fiber lasers can provide pulses with short full width at half maximum (FWHM) in the range of 1 to 5 ns; a relatively low energy per pulse in the order of 100 µJ (i.e. 10 s to 1000 s of µJ); a relatively high beam quality ($M^2$ parameter close to 1); relatively high repetition rates in the order of 20 kHz to 100 kHz. Pulsed fiber lasers are also generally inherently robust and available in a lightweight and compact form factor. Other laser types applicable herein may include, but are not limited to, micro or power chip lasers, or diode pumped lasers.

As noted above, LIBS applications will generally require a minimum fluence value to be achieved. Since the pulse energy from the fiber laser is very low, this minimum fluence criterion requires that the laser beam be focused to a very small spot. Furthermore, when a small laser spot with high fluence and high repetition rate is left stationary on the sample surface, a "hole digging" effect occurs: the high level of localized ablation creates a crater which sinks very rapidly into the target surface. As a consequence, the plasma plume becomes buried into the sample and the plasma emission fades and disappears. For this reason, the laser beam may continuously sweep the sample surface over a small area during the laser emission to avoid pitting. This scanning action with the fiber laser also has further benefits; for example, it may lead to a more significant spatial averaging of the elemental composition of the sample (i.e. over the scan area), in comparison with single point measurement common with other common laser sources. Accordingly, the fiber laser, preferably coupled to a beam scanning system, can provide an adequate component for improved LIBS systems that fulfill the above-noted parameters.

With respect to detection, time-resolved LIBS measurements are currently performed using a line camera or an Image intensifier CCD camera (ICCD), which are suitable when combined with a laser source operating in the mJ range. Namely, the radiant flux emitted by the plasma following a single laser shot from a laser source operating in this range will generally be high enough to generate an adequate level of signal for detection by a line camera. Where the radiant flux is somewhat lower, an ICCD operated in the gated mode may be more appropriate.

In the case of a fiber laser, however, or other such laser sources as may be appropriate to comply with the above-noted parameters, because of the significantly lower energy per pulse that can be reached (i.e. 10 s to 1000 s of µJ), the plasma emission following a single laser pulse may not be strong enough to be detected with adequate sensitivity using a line camera or even an ICCD.

That being said, operation of an ICCD in "accumulate on chip" (AOC) mode may circumvent, to some extent, detection challenges associated with a low radiant flux per pulse. In normal operation with low repetition rate lasers, when a laser pulse is generated, the camera is triggered and the CCD pixels are exposed to the plasma light emission during the measurement window (gate width $t_b$), following a time delay $t_d$. The charge readout is performed at the end of a preset CCD chip integration period $t_i$ (with $t_b \ll t_i$ and $t_b \le$ the pulse repetition rate period). In this configuration, there is one gated measurement window generated per laser shot cycle. In the AOC mode, for example with a fiber laser whose the laser repetition rate is much higher and inter-pulse period much shorter, the gated measurement window may be repetitively activated for a large number (e.g. tens of thousands) of times during a single CCD chip integration period $t_i$. For all these successive laser pulse emission/light detection cycles, the gate width $t_b$ and the delay $t_d$ with respect to each laser pulse are kept constant. As a consequence, a large number of cumulated time-resolved photons are detected and measured during a single CCD integration period. This process allows to exploit more efficiently the dynamic range of the CCD and to meet the sensitivity requirements for the analytical performance of the LIBS probe.

That being said, and as noted above, while providing a potentially applicable solution for a laboratory or commercial setting, the use of ICCD cameras may still suffer some drawbacks for the production of lower cost portable equipment. For instance, ICCD cameras tend to be bulky and heavy, the image intensifier is tends to be particularly fragile, and the general cost for an ICCD can generally range from US $50,000 to US $60,000, all potentially significant drawbacks. In fact, ICCD cameras are generally designed to be operated in a lab environment, and thus generally lack characteristics (e.g. robustness, form factor) amenable to field applications.

As an alternative, and as further detailed below in accordance with different embodiments, novel detection schemes are disclosed to perform time-resolved measurements in conditions where a low energy per pulse and high repetition rate laser source (such as a fiber laser) is used, that is, without resorting to the utilization of an ICCD, for example.

In order to interface with the LIBS emissions generated from a low energy/high repetition rate laser source, as considered by at least some of the herein-described embodiments, a time-resolved detection scheme can be provided to a) detect the photons emitted during a selected temporal window for each laser pulse; b) cumulate detected photons for a given number of laser pulses; and c) transfer a signal representative of these cumulated photons.

To do so, one solution involves the use of a photon-counting device (PCD), such as a photomultiplier tube, coupled to a gated counting circuitry. In this approach, the PCD can be mounted behind a narrow slit located in the spectrogram plane of a spectrometer. As such, the PCD detects the light associated with a narrow spectral range, which can be selected to be coincident, for instance, with the peak of a spectral line corresponding to a given element of interest. For each photon, initially emitted by the plasma, which is allowed to travel through the optical detection chain and reach the PCD detector surface, a voltage pulse will be generated. These pulses are then detected and counted using the counting circuitry. This circuitry can be designed to read the number of pulses detected within a selected measurement window, in a fashion similar to the ICCD configuration where the image intensifier plays the role of a gated shutter. The detected counts corresponding to a train of successive laser pulses can then be added together to produce the desired cumulated output signal.

One potential candidate for the PCD in this example is the photomultiplier tube (PMT). When set up in the appropriate wiring/interface configuration, the PMT can be operated in the photon-counting mode described above. While this solution overcomes some of the drawbacks of the ICCD, it bears certain drawbacks of its own. Namely, PMT units can be rather bulky; they are fragile (i.e. owing to the use of an external glass envelope); and generally necessitate the use of a high-voltage source (e.g. 3000 V).

Another solution that addresses some of these drawbacks, in accordance with some embodiments, involves the use of a solid-state sensor which possess the characteristics noted above to act as a PCD and further or better suits the characteristics noted above to extend LIBS to new applications beyond the laboratory. One such example of a suitable solid state detector is the Silicon photomultiplier (SiPM). Much as the PMT, the SiPM is characterized by a relatively high internal gain ($10^6$); a relatively fast response time (pulses FWHM<1 ns); and it can be used in a photon counting mode.

Furthermore, the SiPM can be operated at a relatively low bias voltage, (e.g. 30 V); it generally has an excellent temperature stability; it is generally relatively compact and robust by taking the form of a solid-state chip; and is of relatively low cost. Furthermore, the SiPM has high gain and moderate photon detection efficiency (PDE) (~20%), very similar to the PMT, but has the physical benefits of compactness, ruggedness and magnetic insensitivity. In addition, the SiPM achieves its high gain ($10^6$) with very low bias voltages (~30V) and the noise is almost entirely at the single photon level. Because of the high degree of uniformity between the microcells, the SiPM is capable of discriminating the precise number of photoelectrons detected as distinct, discrete levels at the output node. The ability to measure a well resolved photoelectron spectrum is a feature of the SiPM which is generally not possible with PMTs due to the variability in the gain, or excess noise.

Accordingly, the SiPM provides a particularly attractive solution to replace the use of ICCDs in standard laboratory systems to extend the applicability of LIBS. That being said, depending on the application at hand, as the PDE profile of the Silicon sensor as a function of the optical wavelength drops drastically below 300 nm (which is not the case for PMTs equipped with appropriate photocathode materials), further considerations may be required for applications involving emissions of interest in the UV part of the spectrum (i.e. emissions around and below 300 nm). In order to circumvent this potential issue, a coating of wavelength-converting material, e.g. a phosphor such as, for example, but not limited to Metachrom/Lumogen E, on the sensor surface. For instance, a Lumogen coating will allow to effectively, reliably and inexpensively achieve a significant increase in device sensitivity in the 120 to 430 nm range, and thus, provides a useful solution when applied to an SiPM sensor within the present context to encompass the relatively high spectral density of elemental lines of interest within this range.

Figure 1:
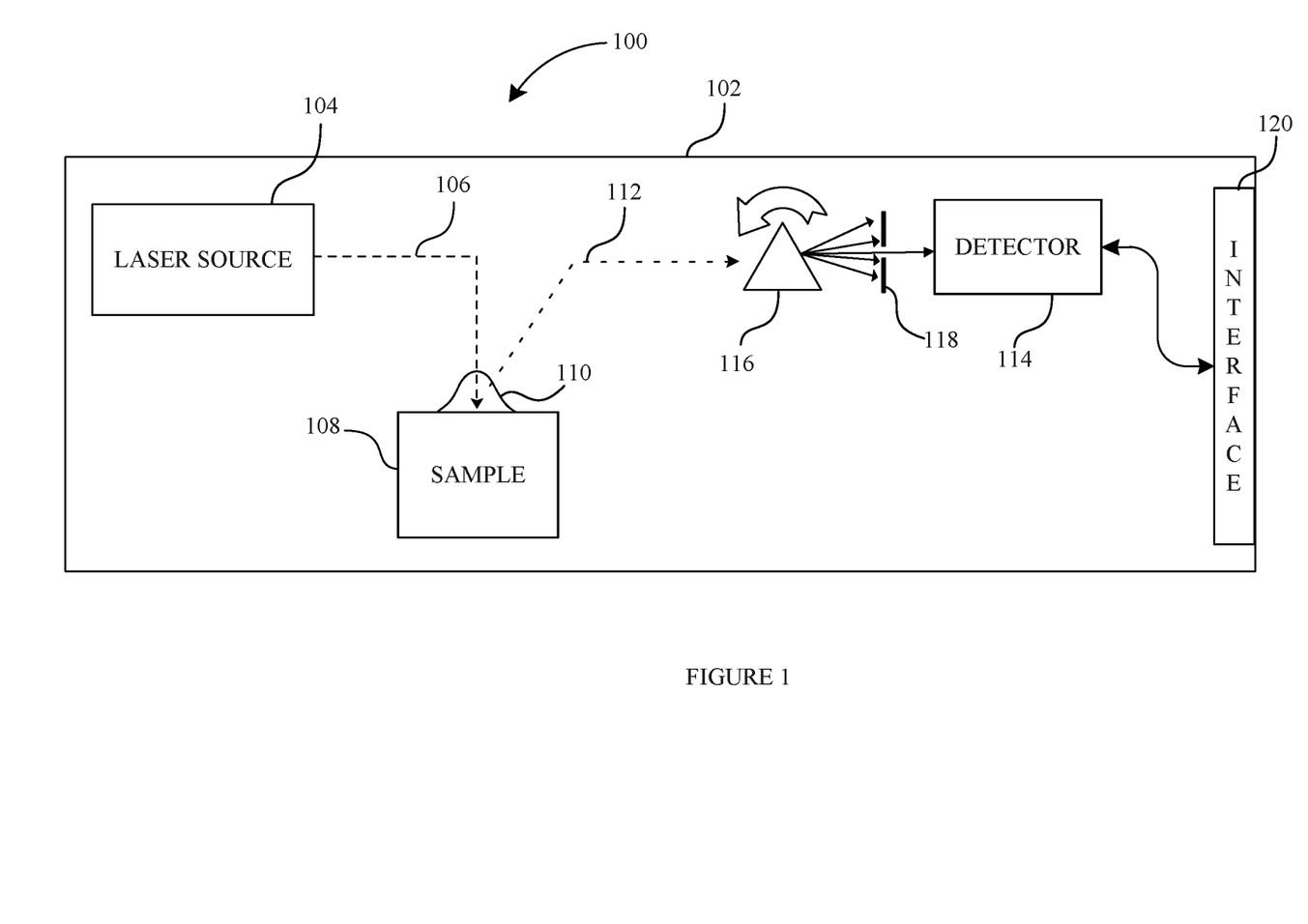
FIG. 1 is a high level diagram of a LIBS system, in accordance with one embodiment.

With reference to FIG. 1, and in accordance with one embodiment, a high level diagram of a portable/handheld LIBS system or device will be described. In the illustrated embodiment, the portable device 100 generally comprises a portable housing 102 or the like, in which are mounted the various constituent components of the LIBS system 100. For instance, the device 100 includes a pulsed laser source 104, such as a fiber laser or other laser sources readily amenable for portability, as will be described further below, and appropriate optics (not shown) to relay the pulsed laser radiation 106 to a target sample 108. In this example, the target sample 108 is shown as being disposed within the housing 102, though persons of ordinary skill in the art will readily appreciate that other sample targeting configurations may otherwise be considered without departing from the general scope and nature of the present disclosure. It will also be appreciated that while the illustrated examples contemplate portable devices, similar equipment and configurations may also apply in an open setting, such as in a laboratory, industrial and/or commercial setting, for example.

As introduced above, the laser radiation 106 will ablate/vaporize matter from a target sample 108, and interact with the vaporized matter to create a plasma plume 110, which in turn radiates light 112 at least partly representative of the sample's constituent elements. This radiated light is then directed to a detector 114 (e.g. SiPM, PMT, etc.) via intervening optics so to selectively detect one or more spectral components thereof representative of corresponding elements of interest within the sample. In this illustrated example, intervening optics are schematically illustrated for illustrative purposes only, as a rotatable prism 116 and slotted plate 118 so to selectively direct a selected spectral component of the output radiation toward the detector. Various optical configurations may be considered to achieve this effect, such as various spectrometer configurations and/or implementations that ultimately encompass the detector 114 at its output, as will be described in greater detail below. For instance, while a scanning or sweeping optical configuration may be configured to selectively sweep through various spectral ranges and/or lines over time to capture a broader spectral output representative of different constituent elements of the sample, other configurations may otherwise provide for a series or array of sensors whereby different spectral components interface with different constituent array sensors to output respective signals corresponding to these different spectral components. In such configurations, the detector 114 may thus represent a 1D or 2D array of detectors disposed in a spatial array perpendicular to the incident spectrally dispersed beams.

While not illustrated specifically in this example, in order to accommodate different spectral regions of interest, for instance where the detector(s) 114 consists of an SiPM or like detector operating more favourably in a first spectral region distinct from a spectral region of interest, a wavelength conversion element, such as distinct element or coating as described above, may drastically increase the detector's ultimate sensitivity to the spectral region of interest by virtue of the spectral shift applied by the wavelength-conversion element.

Ultimately, the detector(s) 114 will relay a corresponding signal representative of the captured radiation through an internal and/or external interface 120 for further processing and analysis. Namely, the analysis of the plasma-emitted light brings qualitative and quantitative information on the nature and concentration of the target's constituent elemental components. More specifically, the qualitative and quantitative data related to the elemental components of the target is obtained from the processing and analysis of the spectral signature of the plasma-emitted light.

Likewise, input commands and/or instructions may be furnished through the same or distinct interface to control, for example, the spectral region of interest (e.g. control spectral sweeping speed and/or range, time-gating parameters in a time-gated embodiment (detector delay, sampling window, etc.), photon-counting parameters when operating in a photon-counting mode (pulse-per-sample, etc.), etc.).

Figure 2:
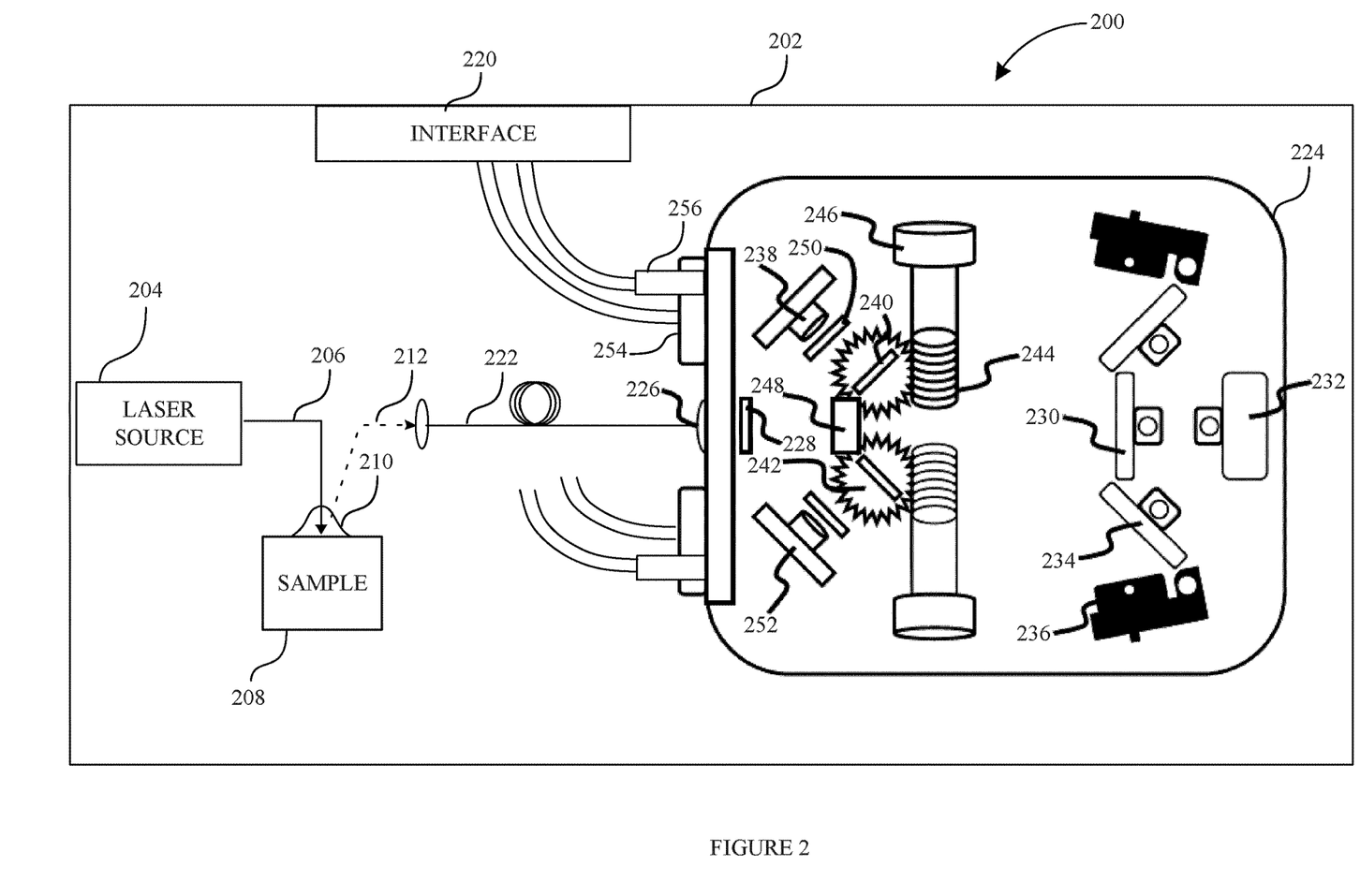
FIG. 2 is a diagram of a portable LIBS system having a compact spectrometer therein, in accordance with one embodiment.

In order to further accommodate the use of a SiPM-based photon-counting detection scheme, and in accordance with one exemplary embodiment, a compact form factor spectrometer was designed and optimized, as detailed below. As in FIG. 1, the LIBS system is schematically illustrated as a portable device 200 generally comprising a portable housing 202 or the like, in which are mounted the various constituent components of the LIBS system 200. For instance, the device 200 again includes a pulsed laser source 204, such as a fiber laser or other laser sources readily amenable for portability, and appropriate optics (not shown) to relay the pulsed laser radiation 206 to a target sample 208. In this example, the target sample 108 is again shown as being disposed within the housing 202, though persons of ordinary skill in the art will again readily appreciate that other sample targeting configurations may otherwise be considered without departing from the general scope and nature of the present disclosure.

Again, the laser radiation 206 will ablate/vaporize matter from a target sample 208, and interact with the vaporized matter to create a plasma plume 210, which in turn radiates light 212 at least partly representative of the sample's constituent elements. This radiated light is then directed, in this example, to an input optical fiber 222 that directs the captured radiation to a compact spectrometer 224.

In this particular example, the spectrometer was optimized for operation in the UV part of the spectrum between 185 nm and 235 nm, though other configurations may readily apply. It generally consists of a two-channel folded-path Czerny-Turner design featuring a high groove density, plane holographic grating. The input light field is at normal incidence with respect to the grating. Owing to the design wavelength range noted above, both the −1 and +1 orders of diffraction can simultaneously be used and detected via respective SiPM detectors.

As detailed below, the design relies on the use of transmittive plano-convex lenses for both the collimating and imaging optics. Each of the SiPM sensors is set for the detection of a single wavelength interval, which is a function of the spectrometer configuration parameters. However, in order to allow a fine adjustment of the set wavelength, small UV fused silica refractive plates are mounted in front and close to each detector. These plates are attached to miniature externally-controllable rotation stages. By performing a small angular rotation of the plate, the spectrogram can be slightly translated along the image plane, for the purpose of achieving minute adjustments of the detected wavelength interval. This configuration also allows proceeding to successive automated measurements with different spectral lines at the same target location.

In particular, the spectrometer 224 includes an SMA connector 226 for input optical fiber 222. An input slit 228 positioned in front of the input optical fibre's core permits input light to propagate through the collimation lens 230 disposed so to collimate the input light onto the diffraction grating 232 mounted on the opposite end of the spectrometer 224. Diffracted −1 and +1 orders are directed through respective imaging lenses 234 to folding mirrors 236, which redirect the respective diffracted orders toward respective SiPM detectors 238. In order to dynamically select a spectral component of interest, rotating refractive plates 240 are provided in each detector path on respective rotation stages 242 driven by corresponding worm drives. The latter each consist of a worm gear 244 acting on the rotation stage 242 and driven by a DC servo motor and gear reducer governed by a quadrature encoder (jointly schematically illustrated as element 246). A Hall effect encoder 248 for rotation stage homing is also provided in this example.

While not explicitly shown in this figure, in order to optimize the sensitivity of the SiPM detectors for the spectral range of interest (i.e. to extend its operational range into the UV and VUV portions of the spectrum), which would otherwise be beyond the ideal spectral response spectrum of the SiPM, a respective wavelength-converting coating is applied to each detector that effectively decreases the UV input wavelength to a more appropriate wavelength for detection.

An output (image) slit 250 is also provided in front of each SiPM detector 238, which are themselves mounted on respective two-axis flexure mounts 252 for fine detector position adjustments. Input/output electric/electronic interfaces 254 are also provided (e.g. a DB15 connector for each detection channel), as well as fast output detector output connectors 256 (e.g. a SMB connector for each detection channel). Each connector is schematically relayed to input/output interface 220.

As described above in accordance with some embodiments of the instantly disclosed subject matter, a portable, low cost LIBS system can be provided that relies on the utilisation of a silicon photomultiplier (SiPM) as its detector(s). In the illustrated examples, a low energy laser source, such as a fiber laser or like laser source, is also used to enhance the portability of the device without unduly limiting the system's overall sensitivity. Namely, by leveraging various detection enhancement techniques such as time-gated detection, multi-pulse photon counting detection, and/or wavelength conversion detection optimisation, effective results may be achieved without invoking otherwise cumbersome, bulky, expensive and/or fragile equipment commonly used in a laboratory setting.

As noted above, in some embodiments, a one or two dimensional array of SiPM detectors can be used rather than the single detectors used in the two-channel embodiment illustrated in FIG. 2, in order to allow for the simultaneous detection of multiple spectral lines via adjacent array sensors. This approach may be used instead of, or in concert with spectral sweeping techniques as described above to cover different spectral ranges for a given sample.

Given the above and the availability of portable, robust and/or lower cost LIBS systems and devices, further LIBS applications may also become more readily available. For example, systems and devices as described herein may be amenable to the elemental detection and/or quantification of carbon, gold and/or precious metal group elements within target samples, and that, with low LOD values as low as sub ppm level, for example.

In one particular application, a handheld LIBS probe can be configured to measure the carbon content in steel samples, for example. Using some of the techniques described above, such as using time-gated and photon counting measurements, such measurements may be implemented in air rather than to resort to the use of a purge gas (a technique otherwise common in the art).

For instance, the speciation of carbon in steel generally requires that the measurement of the contribution of carbon coming from ambient air be distinguished from the (sought) target contribution. This requirement can be fulfilled in the examples provided herein by performing time-resolved (gated) detection thanks to the present invention. As discussed above, time-resolved detection can also be achieved using a photon-counting mode configuration, as illustrated by the following results.

Figure 3A:
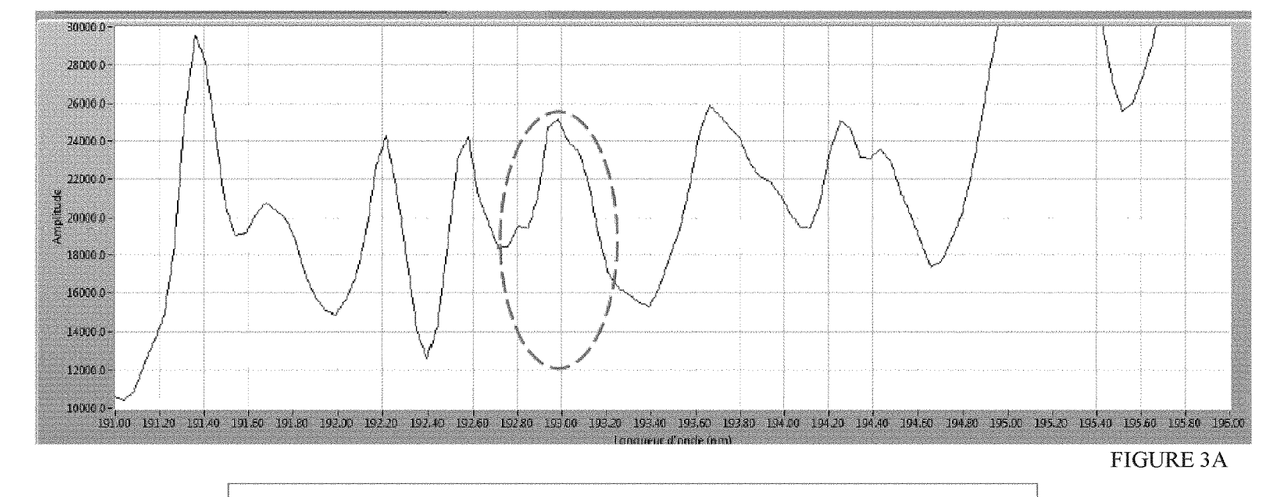
Figure 3B:
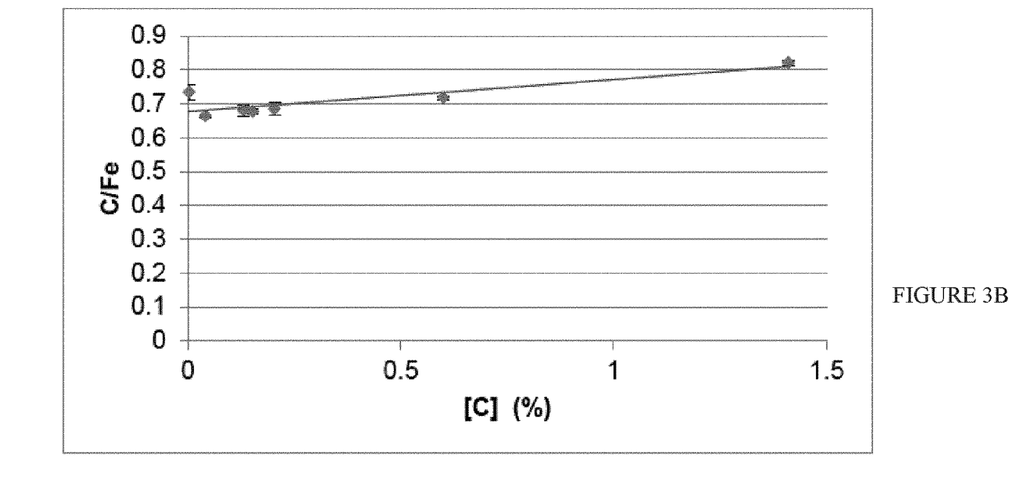

With reference to FIGS. 3A and 3B, the measurement of the carbon line for a given sample is performed with a fiber laser, ICCD camera, with accumulation on chip, but without time-gating. The carbon line can hardly be extracted from the spectral feature shown inside the dotted ellipse, for carbon concentrations ranging from 0 to 14,000 ppm.

Figure 4A:
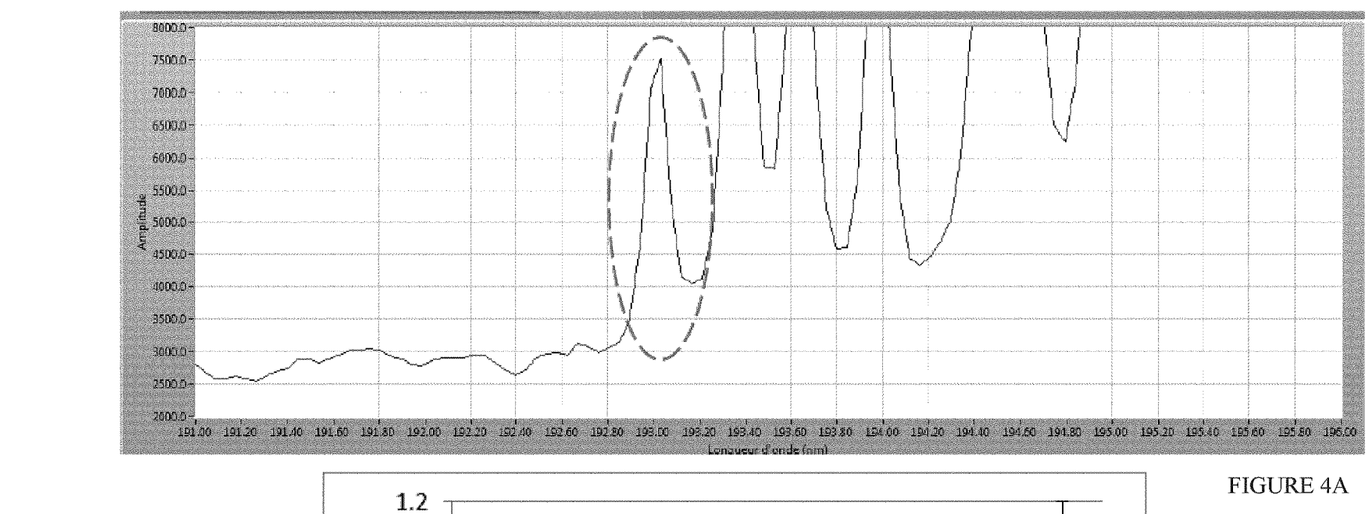
FIGS. 4A and 4B are graphs of a measurement of the carbon line for a given sample performed with a fiber laser, ICCD camera, with accumulation on chip, and with time-resolved detection, which show the carbon line standing out remarkably as compared to the results of FIGS. 3A and 3B thus demonstrating a significantly increased dynamic range of the net carbon line value.
Figure 4B:
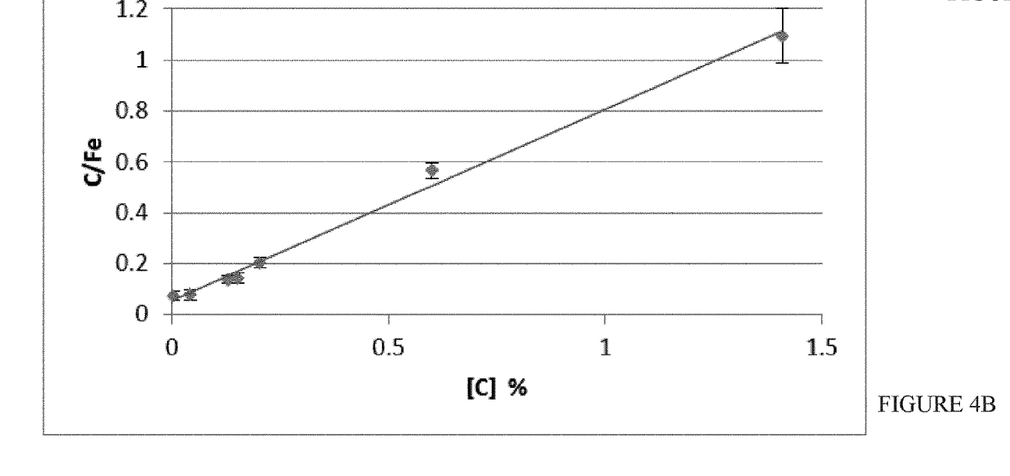

On the other hand, with the same measurement obtained now using time-resolved detection, shown in FIGS. 4A and 4B, the carbon line stands out remarkably. The dynamic range of the net carbon line value is significantly increased thanks to the present invention.

While the present disclosure describes various exemplary embodiments, the disclosure is not so limited. To the contrary, the disclosure is intended to cover various modifications and equivalent arrangements included within the general scope of the present disclosure.

What is claimed is:

1. A laser-induced breakdown spectroscopy (LIBS) system to detect a constituent element of interest within a sample, wherein the LIBS system is operable to produce a plasma from the sample that emits light representative of the constituent element of interest, the system comprising a silicon photomultiplier (SiPM) operable to detect the light emitted from the plasma, and output a signal representative thereof in detecting the constituent element of interest, wherein said SiPM is operable in a time-gated mode so as to constrain detection thereby to a predefined temporal window predefined relative to each probing laser pulse so as to isolate emitted light corresponding to the element of interest.

2. The LIBS system of claim 1, further comprising a wavelength conversion element disposed relative to said SiPM so as to convert a wavelength of emitted light representative of the sample prior to detection by the SiPM in detecting the constituent element of interest.

3. The LIBS system of claim 1, wherein said SiPM comprises a SiPM array consisting of a linear SiPM array or a two-dimensional SiPM array.

4. The LIBS system of claim 1, the system further comprising:
a pulsed laser source operable to irradiate the sample using repetitive laser pulses and thereby create the plasma that emits light representative of the sample's one or more constituent elements; and
intervening optics defining an optical path for an emitted spectral portion of said emitted light that is within a predefined wavelength interval corresponding with the constituent element of interest;
wherein said SiPM is disposed within said path and is operable to detect said emitted spectral portion, and output the signal representative thereof.

5. The LIBS system of claim 4, further comprising a wavelength conversion element in said path that converts said emitted spectral portion to a converted spectral portion, wherein said SiPM is relatively more sensitive to said converted spectral portion thereby increasing detectability of said emitted spectral portion by said SiPM.

6. The LIBS system of claim 5, wherein said conversion element comprises a coating.

7. The LIBS system of claim 6, wherein said coating comprises a phosphorus coating.

8. The LIBS system of claim 4, the system to concurrently detect two or more constituent elements of interest:
wherein said intervening optics comprises sweeping optics operable to dynamically sweep through respective spectral portions of said emitted light along said path over multiple laser pulses; and
wherein said SiPM is operable to detect said respective spectral portions and output respective signals representative thereof.

9. The LIBS system of claim 4, the system to concurrently detect two or more constituent elements of interest:
wherein said intervening optics defines respective optical paths for respective spectral portions of said emitted light that are within respective predefined wavelength intervals respectively corresponding with the two or more constituent elements of interest; and
wherein the system comprises two or more SiPMs disposed within said respective paths and operable to detect said respective spectral portions and output respective signals representative thereof.

10. The LIBS system of claim 4, wherein said pulsed laser source is a pulsed fiber laser, a micro or power chip laser, or a diode pumped laser.

11. The LIBS system of claim 4, wherein said intervening optics comprises a spectrometer.

12. The LIBS system of claim 4, wherein said pulsed laser source has an energy per pulse of from about 1 µJ to a few thousands of µJ and a pulse rate of from about 1 kHz to about 1 MHz.

13. The LIBS system of claim 12, wherein said energy per pulse is from about 10 µJ to about 1000 µJ, and wherein said pulse rate is from about 1 kHz to about 500 kHz.

14. The LIBS system of claim 13, wherein said energy per pulse is from about 50 µJ to about 500 µJ, and wherein said pulse rate is from about 10 kHz to about 100 kHz.

15. The LIBS system of claim 4, wherein said SiPM is operated in said time-gated mode so as to constrain detection thereby of said spectral portion to said predefined temporal window predefined relative to each probing laser pulse so as to isolate emitted light corresponding to the element of interest.

16. The LIBS system of claim 4, wherein said SiPM is operated in a photon counting mode so as to count photons detected thereby in said spectral portion over multiple probe laser pulses.

17. The LIBS system of claim 1, wherein said SiPM is operable in a photon counting mode so as to count photons detected thereby over multiple probe laser pulses.

18. The LIBS system of claim 1, wherein the element of interest is carbon, gold, or a precious metal group element.

19. The LIBS system of claim 1, wherein the system is a portable or handheld system.

20. The LIBS system of claim 1, wherein the system further comprises a pulsed laser light source to produce the plasma from the sample: wherein the SiPM is operable to detect at least a spectral portion of the light within a predefined wavelength interval corresponding with the constituent element of interest; and wherein said SiPM is operable in a time-gated photon counting mode so to constrain detection of said spectral portion to a said predefined temporal window predefined relative to each laser pulse, and so as to count photons detected thereby within said window over multiple laser pulses to output said signal.

21. A method for detecting a constituent element of interest within a sample, the method comprising: irradiating the sample using repetitive laser pulses to create a plasma that emits light representative of the sample's one or more constituent elements; directing at least a spectral portion of said emitted light that is within a predefined wavelength interval corresponding with the constituent element of interest toward a silicon photomultiplier (SiPM); detecting, via said SiPM, said spectral portion of said emitted light within said predefined wavelength interval; and outputting a signal representative of said spectral portion and thereby indicative of a presence of the constituent element of interest within said sample, wherein said detecting comprises constraining detection of said spectral portion to a predefined temporal window predefined relative to each of said laser pulses to isolate emitted light corresponding to the element of interest.

22. The method of claim 21, further comprising, prior to said detecting, converting said spectral portion to a converted wavelength, wherein said SiPM is relatively more sensitive to said converted wavelength thereby increasing detectability of said spectral portion by said SiPM.

23. The method of claim 21, wherein said detecting comprises counting photons corresponding with said spectral portion over multiple laser pulses prior to outputting said signal.

24. The method of claim 21, the method for concurrently detecting two or more constituent elements of interest:
wherein said directing comprises sequentially directing respective spectral portions of said emitted light toward said SiPM over multiple laser pulses;
wherein said detecting comprises sequentially detecting said respective spectral portions; and
wherein said outputting comprises outputting respective signals representative of each of said spectral portions.

25. The method of claim 21, the method for concurrently detecting two or more constituent elements of interest:

wherein said directing comprises directing respective spectral portions of said emitted light toward respective SiPMs;

wherein said detecting comprises concurrently detecting said respective spectral portions via said respective SiPMs; and wherein said outputting comprises outputting respective signals representative of each of said spectral portions.

\* \* \* \* \*